US009481581B2

(12) United States Patent
Grothe et al.

(10) Patent No.: US 9,481,581 B2
(45) Date of Patent: Nov. 1, 2016

(54) PROCESS FOR THE PRODUCTION OF A STORAGE-STABLE BARIUM SULPHATE HAVING GOOD DISPERSIBILITY

(75) Inventors: Sonja Grothe, Oberhausen (DE); Jörg Hocken, Meerbusch (DE); Elke Gosch, Krefeld (DE); Bernd Rohe, Moers (DE); Peter Ebbinghaus, Herten (DE); Jens Kohnert, Alpen (DE)

(73) Assignee: Sachtleben Chemie GmbH, Duisburg (DE)

( * ) Notice: Subject to any disclaimer, the term of this patent is extended or adjusted under 35 U.S.C. 154(b) by 970 days.

(21) Appl. No.: 12/994,186

(22) PCT Filed: May 28, 2009

(86) PCT No.: PCT/EP2009/056585
§ 371 (c)(1),
(2), (4) Date: Nov. 29, 2010

(87) PCT Pub. No.: WO2009/147077
PCT Pub. Date: Dec. 10, 2009

(65) Prior Publication Data
US 2012/0077059 A1  Mar. 29, 2012

(30) Foreign Application Priority Data
Jun. 2, 2008 (DE) .......................... 10 2008 026 268

(51) Int. Cl.
*C01F 11/46* (2006.01)
*B82Y 30/00* (2011.01)
*C09C 1/02* (2006.01)

(52) U.S. Cl.
CPC .............. *C01F 11/462* (2013.01); *B82Y 30/00* (2013.01); *C09C 1/027* (2013.01); *C01P 2004/61* (2013.01); *C01P 2004/62* (2013.01); *C01P 2004/64* (2013.01); *C01P 2006/22* (2013.01)

(58) Field of Classification Search
None
See application file for complete search history.

(56) References Cited

U.S. PATENT DOCUMENTS

| 4,551,497 A | 11/1985 | Shinozuka et al. |
| 7,985,289 B2 | 7/2011 | Ono et al. |
| 2004/0197262 A1 * | 10/2004 | Hardinghaus et al. ....... 423/554 |
| 2009/0318594 A1 | 12/2009 | Grothe et al. |
| 2009/0326114 A1 | 12/2009 | Grothe et al. |

FOREIGN PATENT DOCUMENTS

| DE | 3347191 A1 | | 6/1984 |
| DE | 3635050 A1 | | 4/1988 |
| DE | 3703377 A1 | | 8/1988 |
| DE | 3825774 A1 | | 2/1990 |
| DE | EP0586003 | * | 8/1993 |
| DE | 44 31 735 A1 | | 3/1996 |
| DE | 102007040641 | * | 8/2007 |
| DE | 10 2007 040641 A1 | | 3/2008 |
| DE | 10 2007 040658 A1 | | 3/2008 |
| DE | 102007040641 | * | 3/2008 |
| EP | 0 586 003 A | | 3/1994 |
| EP | 0 587 105 A | | 3/1994 |
| GB | 2 134 094 A | | 8/1984 |
| GB | 2134094 | * | 8/1984 |
| JP | S59122554 A | | 7/1984 |
| JP | GB2134094 | * | 8/1984 |
| JP | EP0587105 | * | 9/1993 |
| WO | 2007069353 A1 | | 6/2007 |
| WO | 2008023074 A1 | | 2/2008 |
| WO | 2008023075 A1 | | 2/2008 |

OTHER PUBLICATIONS

English Abstract of EP 0 586 003 A.
English Abstract of EP 0 587 105 A.
English Abstract of DE 44 31 735 A1.
English Abstract of DE 10 2007 040641.
English Abstract of DE3825774 (A1).
English Abstract of DE3703377 (A1).
English Abstract of DE3635050 (A1).
International application No. PCT/EP2009/056585, Notification of Transmittal of the International Preliminary Report on Patentability, dated Aug. 18, 2010.
International application No. PCT/EP2009/056585, Notification of Transmittal of the International Search Report and the Written Opinion of the International Searching Authority, or the Declaration, dated Oct. 21, 2009.
English abstract of WO2008023075 (A1)—Feb. 28, 2008.
English abstract of WO2008023074 (A1)—Feb. 28, 2008.
English abstract of JPS59122554 (A)—Jul. 16, 10984.
English abstract of WO2007069253 (A1)—Jun. 21, 2007.

\* cited by examiner

*Primary Examiner* — Melvin C Mayes
*Assistant Examiner* — Colette Nguyen
(74) *Attorney, Agent, or Firm* — Cahn & Samuels, LLP

(57) ABSTRACT

The invention concerns a process for the production of a storage-stable barium sulphate, the barium sulphate produced thereby and the use thereof as an additive.

15 Claims, No Drawings

PROCESS FOR THE PRODUCTION OF A STORAGE-STABLE BARIUM SULPHATE HAVING GOOD DISPERSIBILITY

This U.S. patent application is a national stage application of PCT/EP2009/056585 filed on 28 May 2009 and claims priority of German patent document 10 2008 026 268.4 filed on 2 Jun. 2008, the entirety of which is incorporated herein by reference.

TECHNICAL FIELD

The invention concerns a process for the production of a storage-stable barium sulphate having good dispersibility and the use thereof.

BACKGROUND OF INVENTION

Barium sulphate is used to a great extent for example in the dye, paint and lacquer, plastic, fibre, paper and rubber industry. It is distinguished in that as a totally inert filler it does not involve any reaction with other chemicals used in those branches of industry. In comparison with other solids such as calcium carbonate barium sulphate is distinguished by its very high chemical resistance. In particular the low Mohs hardness is advantageous, in comparison with silicon dioxide and aluminium dioxide.

In general terms barium sulphate is produced by the reaction of a barium salt such as that of the sulphide, chloride or nitrate with sulphuric acid or a salt thereof such as sodium sulphate in an aqueous solution. That reaction generally gives barium sulphate which usually has a primary particle size of 0.01 to 20 µm. The barium sulphate produced in that way is filtered off, washed with water, dried and deagglomerated for various purposes of use.

Optionally the barium sulphate particles are provided with additives prior to or after drying. The deagglomeration operation is usually performed by dry crushing for example using impact grinding mills. If deagglomeration of the barium sulphate particles in accordance with the state of the art is implemented, those barium sulphate particles can be well dispersed in organic and aqueous systems. A disadvantage of the barium sulphate particles produced in the state of the art however is the marked worsening in dispersibility in organic and aqueous systems due to storage.

DE-A1 33 47 191 discloses a process for the production of a surface-treated barium sulphate. That process involves using an aqueous $BaSO_4$ suspension containing an excess of Ba ions. 0.1 to 30% by weight of an aqueous alkali silicate solution is added to that suspension so that initially barium sulphate precipitates. A mineral acid is then added and a pH-value of less than or equal to 7 is set for decomposition of the barium sulphate to give water-bearing silicon dioxide. The described process steps are preferably effected at temperatures of at least 40° C. The barium sulphate treated in that way however still does not have satisfactory dispersion properties, particularly if the barium sulphate has been stored over a prolonged period of time.

DE-A1 44 31 735 discloses a process for the production of an inorganically treated filler for polymers from $BaSO_4$, wherein firstly $H_3PO_4$ or a water-soluble phosphate compound is added to an aqueous $BaSO_4$ suspension. The process then involves the successive addition to the suspension of $Na_2SiO_3$ at a pH-value of less than 7.5 and an aqueous aluminium compound at a pH-value of greater than 4.5. The described process steps are performed at temperatures of 65 to 75° C.

Summarizing, the barium sulphates known in the state of art show remarkable worsening of dispersibility after storage.

Therefore the object of the invention is to provide a barium sulphate which even after prolonged storage has an improved dispersibility in organic and aqueous systems.

SUMMARY OF INVENTION

It was now surprisingly found by the inventors that such a barium sulphate can be produced by means of the process having the features recited in the main claim.

Thus the present invention concerns a process for the production of a barium sulphate, in which:

a) an aqueous suspension of barium sulphate is set in the presence of an excess of sulphate ions to a pH-value of 9 to 12;

b) the resulting suspension of barium sulphate is mixed at a pH-value of 9 to 12 with at least one aqueous solution of a water-soluble metal compound or a mixture thereof;

c) the resulting suspension is set to a pH-value of 3 to 9 by the addition of at least one acid or acid mixture to precipitate a metal-oxygen compound of the water-soluble metal compound on the surface of the barium sulphate particles; and d) the resulting barium sulphate particles are filtered off.

DETAILED DESCRIPTION OF THE INVENTION

Firstly a water-soluble barium compound is treated in an aqueous solution with a stoichiometric excess of sulphate ions and is precipitated in the form of barium sulphate particles. The precipitated barium sulphate is filtered, washed and re-suspended at a pH-value of 9 to 12 in an aqueous solution. In another embodiment of the process according to the invention barium sulphate in powder form can be re-suspended and an excess of sulphate ions set, and the re-suspended barium sulphate suspension is then adjusted to a pH-value of 9 to 12.

The aqueous initial slurry of the barium sulphate in particle form which contains an excess of sulphate ions can preferably be produced by the reaction of barium sulphide with sulphuric acid or with the water-soluble salts thereof such as sodium sulphate in aqueous solution in the presence of an excess amount of sulphate ions. That reaction in aqueous solution can therefore also be effected in the presence of deficient amounts of barium sulphide, with respect to the sulphuric acid or salt thereof.

The amounts of barium sulphide can be replaced by other water-soluble barium salts such as for example barium chloride or nitrate. Although this is not critical the sulphate ions in the reaction solution are usually present in an excess of 0.01-20% by weight with respect to the stoichiometric amount and preferably in an excess of 0.01-1.0% by weight.

The reaction in aqueous solution is usually carried out at temperatures not lower than 20° C. and preferably between 40° C. and 90° C. Having regard to economy of the process the aqueous initial slurry is preferably produced in such a way that it contains barium sulphate in amounts of 50 to 500 g/l, although that is not critical.

The precipitated barium sulphate is re-suspended, preferably after at least one washing operation with water, in an aqueous suspension, to give a solid content of 5 to 60% by weight. For reasons concerning economy of the process the solid content is preferably between 20 and 40% by weight.

If necessary, as mentioned above, the initial slurry can be produced by suspending pulverised barium sulphate in water and subsequently adding a water-soluble sulphate compound.

The pH-value of the suspension is set to a pH-value in the range of 9 to 12, for example using NaOH or KOH.

In accordance with the invention at least one aqueous solution of a metal compound which is soluble in the pH-range of 9-12, such as for example an alkali metal silicate, preferably a sodium silicate, potassium silicate or sodium aluminate, or mixtures of such metal compounds or a plurality of solutions of different metal compounds is simultaneously or successively added to the aqueous initial slurry of barium sulphate, with vigorous agitation, in order in the next process step, upon a change in the pH-value to a pH-range of 3 to 9, to precipitate or deposit a metal-oxygen compound which is insoluble in that pH-range such as a metal hydroxide, a metal hydrate, a metal oxyhydroxide and/or a metal oxyhydrate such as for example an alkali metal or alkaline earth silicate or aluminate, silicon dioxide, aluminium silicate or aluminium oxide, also in hydrated form, on the surface of the barium sulphate or the barium sulphate particles in the slurry.

In that respect in accordance with the invention the term metal compound is used to denote a water-soluble compound of a semimetal or metal, selected from the group of alkali and alkaline earth metals, transition metals and main group metals, which is completely dissolved in the aqueous phase of the barium sulphate suspension at the pH-value in the range of 9-12 and is inert in relation thereto, and which is insoluble in the pH-range of 3-9 and is thus deposited on the barium sulphate particles. By way of example, without limitation, mention of a metal forming the water soluble compounds will be made here of aluminium, antimony, barium, calcium, cerium, cobalt, iron, manganese, sodium, silicon, strontium, vanadium, zinc, tin and zirconium. Compounds of sodium, potassium, aluminium and silicon are preferred.

More precisely the suspension of the barium sulphate is mixed with at least one aqueous solution of a metal compound or mixtures thereof, in an amount of up to 20% by weight formed metal oxide, preferably 0.5% by weight of formed metal oxide, with respect to the barium sulphate used. The pH-value and the amounts of metal compound are so selected in accordance with the invention that in this process step the metal compound is present dissolved completely in water. The suspension is agitated intensively, preferably for at least 5 minutes, so that the agents are homogenously distributed in the suspension. Preferably the addition operation is effected at a temperature of at least 20° C., preferably 50° C. to 90° C., particularly preferably 60° C. to 90° C. In accordance with the invention when specifying limit values they are also included.

In accordance with the invention the slurry is then mixed with an acid or mixtures of a plurality of acids in order to precipitate the dissolved metal compound on the surface of the barium sulphate, forming a layer of a metal oxide, a metal hydroxide, a metal hydrate, a metal oxyhydroxide and/or a metal oxyhydrate, as stated hereinbefore. Preferably the acids used are sulphuric acid, aqueous aluminium sulphate solution or phosphoric acid, less preferably hydrochloric acid and nitric acid.

As the precipitation of the metal compound takes place at a lower pH-value the slurry is usually adjusted to a pH-value of 3 to 9, preferably to a pH-value of 4 to 7, particularly preferably to a pH-value of 5. The precipitation operation can be performed at temperatures of about 20° C. or higher and preferably at temperatures of 50° C. to 90° C.

A preferred method according to the invention is one in which in step c) a compound selected from alkali metal, alkaline earth and aluminium-silicon oxygen compounds, hydrates thereof and mixtures thereof is precipitated, wherein the weight ratio of Si/Al calculated as $SiO_2/Al_2O_3$ is in the range of 0.1/1-10/1, preferably at 1/1 to 5/1 and particularly preferably at 2/1-3/1. In that respect an aluminium silicate is particularly preferably precipitated, wherein the weight ratio of Si/Al calculated as $SiO_2/Al_2O_3$ is in the range of 0.1/1-10/1, preferably at 1/1 to 5/1 and particularly preferably at 2/1-3/1.

After precipitation of the metal-oxygen compound on the barium sulphate surface, a further development of the process provides that the barium sulphate suspension is subjected to a maturing treatment, preferably at elevated temperature, over a period of up to two hundred and forty minutes, particularly preferably over a period of 60 to 120 minutes, preferably at a temperature of 50° C. to 90° C.

The maturing treatment is a post-treatment step for complete reaction and deposit of the metal compound on the surface of the barium sulphate and is generally concluded after the specified time.

After the maturing treatment the surface-modified barium sulphate produced in that way can be filtered off, dried and crushed. By way of example spray drying, rack drying, freeze drying and/or grind mill drying present themselves for drying the surface-modified particles.

The surface-modified barium sulphate particles which can be obtained in that way using the process according to the invention are generally of a particle size in the range of 0.1-20 μm, preferably in the range of 0.1-10 μm, particularly preferably from 0.1-6.0 μm and quite particularly preferably in the range of 0.3-1.5 μm.

Optionally a further surface treatment can be effected prior to or after drying. In that case, additives such as for example wetting, dispersing and/or deflocculation agents can be applied to the surface of the barium sulphate particles.

For that purpose one or more of the following substances can be used as additives: alkali metal, alkaline earth metal, transition metal, metal or ammonium salts of organic acids (for example salts of poly(meth)acrylic acid), alkali metal salts of acrylate or methacrylate copolymers, polyphosphates (inorganic or organic polyphosphates, potassium tetrapolyphosphate), poly(meth)acrylates, polyethers, anionically modified polyethers, fatty alcohol polyglycol ethers, modified polyurethanes, anion-active aliphatic esters, carboxylic acids, soaps, metal soaps, alcohols (for example 1,1,1-trimethylol propane), pentaerithritol, neopentyl glycol, polygycol (for example polyethylene glycol), polyethylene glycolether, organic esters, silanes, zirconates, titanates, siloxanes, silicone oils, organic sulphones of the formula $RSO_2R$, organic ketones (R—(C=O)—R), organic nitriles (RCN), organic sulphoxides (R—$SO_2$), organic amides, organic amines (for example triethanol amine), fatty acid esters or fatty acid amides whereby R stands for organic residues, for example alkyl residues.

For the production of silanised surface-modified $BaSO_4$ particles an aqueous suspension comprising inorganically surface-modified $BaSO_4$ particles already produced as described hereinbefore, is additionally modified, with at least one silane. The silanes used are preferably alkoxyalkyl silanes, particularly preferably the alkoxyalkyl silanes are selected from octyltriethoxy silane, γ-methacrylpropyltrimethoxy silane, γ-glycidoxypropyltrimethoxy silane, γ-aminopropyltriethoxy silane, γ-aminopropyltrimethoxy silane, triaminofunctional silane, γ-isocynatopropyltriethoxy silane, vinyltrimethoxy silane and/or hydrolysed silanes such as γ-aminopropylsilsesquioxane. For that purpose, prior to or after the washing operation, a suspension comprising $BaSO_4$ particles inorganically surface-modified with the metal oxide is mixed with an alkoxyalkyl silane with vigorous agitation or with dispersion. In accordance with the invention that is followed by a maturing time, preferably of from 10 to 60 minutes, preferably at temperatures of a maximum of 40° C. The further procedure is then as already described above. Alternatively the alkoxyalkyl silane can also be applied after drying to the inorganically modified particles by being mixed up therewith.

In an embodiment of the invention, at least one process step is carried out in a continuous operating procedure, i.e. the product formed in the defined process step is continuously transferred into the next process step.

Method of Industrial Application of Invention

The invention also concerns the surface-treated barium sulphate which can be produced by the process according to the invention and the use of the barium sulphate as an additive in organic polymer compositions, coatings, dyes, paints and lacquers, primers, dispersion dyes, coating lacquer systems, automobile paints and lacquers, printing inks, including those for the electronics industry (PCB inks), powder lacquers, adhesives, paper and plastic materials such as thermosetting or thermoplastic materials, for example in the form of injection mouldings, films, fibres or blow mouldings.

More precisely the optionally silanised $BaSO_4$ particles according to the invention can be used in coatings for improving mechanical properties, resistance to chemicals, gloss, resistance to corrosion, barrier properties, coverage capability and/or adhesion.

When using a barium sulphate according to the invention for the production of PCB inks, it is found that lacquer layers having the desired optical properties which are improved in comparison with additives used at the present time (increased gloss, reduced turbidity) can be produced with at the same time achieving the required properties in respect for example of rheology control, chemical resistance and solderability.

The particles produced according to the invention can be used in thermosetting materials, elastomers and thermoplastic materials to improve mechanical properties and thermal properties.

The surface-treated barium sulphate which can be obtained by the process according to the invention can be used particularly well for improving the anti-blocking properties in respect of polymer films. In that case the polymer is preferably selected from the group of thermoplastic polymers. They include in particular polyimides, polyamides, polyesters, PVC or polyolefins of olefinic monomers with 2 to 8 C-atoms. The additive is particularly suitable for polymer films of polyester, with PET being particularly preferred. A marked improvement in the COF-values of the films can be demonstrated on the basis of the values measured when using the barium sulphate which is surface-treated according to the invention. For use as anti-blocking additives in films the particle size of the surface-treated barium sulphate in accordance with the invention is in the range of d=0.01-20 µm, particularly preferably being d=0.5-10 µm. The concentration of use of the surface-modified barium sulphate in the films is in accordance with the invention 0.01-5.0% by weight.

Besides the improvement in the anti-blocking properties the inventors carried out investigations for improving the optical properties of the polymers and established that the additives produced according to the invention impart a lesser degree of turbidity, increased transparency and also improved gloss to the polymers, in particular in film form. Thus it is possible to produce high-gloss films with at the same time reduced turbidity.

Accordingly, when using the additive according to the invention for a polymer as referred to hereinbefore, it is also possible to produce what are referred to as "super bright yam" fibres which give a high-gloss fabric. An additive according to the invention of a particle size of d=0.2-0.9 µm is preferably suited for that purpose. The concentration of use of the surface-modified barium sulphate in the fibres is in accordance with the invention 0.01-2.0% by weight.

It is of particular advantage that masterbatches and compounds of thermoplastic materials can be produced by means of the barium sulphates treated according to the invention, in which the additive particles are so excellently dispersed that high-grade products can be produced therefrom, without particular additional complication and expenditure. Introduction of the additive into the polymer procedure can also be effected by way of a slurry route, besides an extrusion masterbatch.

On the basis of investigations the inventors were able to show that use of the surface-treated barium sulphate according to the invention affords at least the same "anti-block performance" (COF) as when using silica with at the same time improved optical film properties (gloss, turbidity, transparency) and with at the same time improved processing properties.

The invention is further described by reference to the examples of production hereinafter.

Examples of Production

The following served as starting materials in all examples of production:
$BaSO_4$—filter cake with 70% solid content, a sulphate excess of 0.1% with respect to barium sulphate and a particle diameter of d=1 µm
demineralised water of a conductivity of about 3 µS/cm
sulphuric acid 5%
$Na_2SiO_3$ solution with 384 g of $SiO_2$/l
$Al_2(SO_4)_3$ solution with 75 g of $Al_2O_3$/l
$NaAlO_2$ solution with 262 g of $Al_2O_3$/l Comparative Example 1

1683 g of $BaSO_4$ paste (~1200 g $BaSO_4$) was weighed out in a 5 L beaker and the corresponding amount of demineralised $H_2O$ added to set a solid content of 30%. The pH-value of the suspension was 11.2. The mixture was dispersed and the resulting suspension was heated with agitation to 80° C. The suspension is adjusted to a pH-value of pH 5 by slow addition of 5% sulphuric acid over a period of 30 minutes. In that operation the suspension was agitated with a turbine agitator. The suspension was then agitated for a further hour at a temperature of 65° C. (maturing time). Thereafter the suspension was sucked away by way of a suction filter. The filter cake was dried at 200° C. in a drying cabinet for two and a half hours. The solid was ground up, mixed with 0.3% triethanolamine and subjected to air jet crushing.

Comparative Example 2

Production of comparative example 2 was carried out in a 5 L beaker. 1323 g of paste was made into a slurry with demineralised H$_2$O, giving 3300 g. The suspension was heated to 70° C. and then adjusted to pH 7 with hydrochloric acid. A barium excess of about 5 g of Ba$^{2+}$/l was then set with 350 mL of BaS solution (~50-55 g BaS/L). Hydrochloric acid was again used to set pH 7, then Na$_2$SiO$_3$ solution (0.2% SiO$_2$ with respect to BaSO$_4$) was added. Hydrochloric acid was used to set pH 4 and maturing was effected for 30 minutes. Soda lye was used to set pH 6.0 and NaAlO$_2$ solution (0.1% of Al$_2$O$_3$ with respect to BaSO$_4$) was added, maintaining the pH-value. Thereafter the procedure involved setting pH 7.0 and maturing for 30 minutes. The suspension was sucked away and washed with about 1.5 L of demineralised water/kg of BaSO$_4$. The filter cake was dried at 200° C. and subjected to air jet crushing.

Comparative Example 3

Production of comparative example 3 was carried out in a 5 L beaker. 1323 g of paste was made into a slurry with demineralised H$_2$O, giving 3300 g. The suspension was heated to 70° C. and then adjusted to pH 7 with hydrochloric acid. A barium excess of about 5 g of Ba$^{2+}$/l was then set with 350 mL of BaS solution (~50-55 g BaS/L). Hydrochloric acid was again used to set pH 7, then Na$_2$SiO$_3$ solution (0.1% SiO$_2$ with respect to BaSO$_4$) was added. Hydrochloric acid was used to set pH 4 and maturing was effected for 30 minutes. Soda lye was used to set pH 6.0 and NaAlO$_2$ solution (0.2% of Al$_2$O$_3$ with respect to BaSO$_4$) was added, maintaining the pH-value. Thereafter the procedure involved setting pH 7.0 and maturing for 30 minutes. The suspension was sucked away and washed with about 1.5 L of demineralised water/kg of BaSO$_4$. The filter cake was dried at 200° C. and subjected to air jet crushing.

Comparative Example 4

Production of comparative example 4 was effected in a 5 L beaker. 1720 g of BaSO$_4$ paste ($\triangleq$ 1204 g of BaSO$_4$) was weighed out and the corresponding amount of demineralised H$_2$O added to set a solid content of 26% by weight. The suspension was heated to 70° C. and then adjusted to pH 7. 25 g of a 20% phosphoric acid (H$_3$PO$_4$) was slowly added to the suspension, corresponding to a proportion of 0.3% of P$_2$O$_5$ with respect to BaSO$_4$. Thereafter 15.7 mL of Na$_2$SiO$_3$ solution was slowly added, corresponding to a proportion of 0.5% SiO$_2$ with respect to BaSO$_4$. In that respect the pH-value was so adjusted that the pH-value does not exceed 7.5. Agitation was effected for a further 15 minutes at 70° C. 26.2 mL of NaAlO$_2$ solution was then slowly added, corresponding to a proportion of 0.57% Al$_2$O$_3$ with respect to BaSO$_4$. The pH-value was so regulated that it does not exceed pH 7.5. The suspension was then agitated for two further hours at a temperature of 70° C. (maturing time). Thereafter the suspension was sucked away by way of a suction filter. The filter cake was dried at 200° C. in a drying cabinet for two and a half hours. The solid was ground up and subjected to air jet crushing.

Example 1

The same process as in comparative example 1 was carried out, but the solid content of the suspension was adjusted to 26%. The pH-value of the suspension was 11.4. In addition, prior to pH adjustment (to pH 5) 15.65 mL of Na$_2$SiO$_3$ solution was added to the BaSO$_4$ solution heated to 80° C., corresponding to a proportion of 0.5% SiO$_2$ with respect to BaSO$_4$.

Example 2

The same process as in comparative example 1 was carried out, but the solid content of the suspension was adjusted to 26%. The pH-value of the suspension was 11.3. In addition, prior to pH adjustment (to pH 5) 9.4 mL of Na$_2$SiO$_3$ solution was added to the BaSO$_4$ solution heated to 80° C., corresponding to a proportion of 0.3% SiO$_2$ with respect to BaSO$_4$.

Example 3

The same process as in comparative example 1 was carried out, but the solid content of the suspension was adjusted to 26%. The pH-value of the suspension was 11.4. In addition, prior to pH adjustment (to pH 5) 10 mL of Na$_2$SiO$_3$ solution was added to the BaSO$_4$ solution heated to 80° C., corresponding to a proportion of 0.32% SiO$_2$ with respect to BaSO$_4$. Instead of the pH-value adjustment with sulphuric acid the pH-value was adjusted with the Al$_2$(SO$_4$)$_3$ solution. The added amount of Al$_2$(SO$_4$)$_3$ corresponded to a proportion of 0.11% Al$_2$O$_3$ with respect to BaSO$_4$.

Example 4

1720 g of BaSO$_4$ paste (~1204 g of BaSO$_4$) was weighed out in a 5 L beaker and the appropriate amount of demineralised H$_2$O was added to set a solid content of 26%. The pH-value of the suspension was 11.5. The mixture was dispersed and the resulting suspension (batch) was heated to 80° C. on the heating plate of a magnetic agitator. 11.6 mL of Na$_2$SiO$_3$ solution was added to the heated BaSO$_4$ suspension, corresponding to a proportion of 0.37% SiO$_2$ with respect to BaSO$_4$. The suspension was then pumped with a pump into a further container (1 L beaker, low form), at about 30 ml/minute. There, Al$_2$(SO$_4$)$_3$ solution was conveyed by way of a further pump into the vessel for pH-value adjustment to pH 5. The added amount of Al$_2$(SO$_4$)$_3$ corresponded to a proportion of 0.11% Al$_2$O$_3$ with respect to BaSO$_4$. The suspension was agitated with a turbine agitator. To keep the filling level of 8 cm constant the suspension which was adjusted to a pH of 5 was conveyed with a further pump into the maturing container (3 L beaker). In that case the suspension was pumped out of the lower region (about 2 cm height) of the vessel at about 30 ml/minute. The suspension was set to a temperature of 65° C. in the maturing container with agitation with a plastic trapezium agitator. After the end of the experiment (about 55 minutes) and an hour maturing time the suspension was sucked away by way of a suction filter. The filter cake was dried at 200° C. in a drying cabinet for two and a half hours. The solid was ground up, mixed with 0.3% by weight of triethanolamine and subjected to air jet crushing.

Example 5

The same process as in comparative example 1 was carried out, but the sold content of the suspension was set to 26%. The pH-value of the suspension was 11.7. Instead of pH-value adjustment with sulphuric acid the pH-value 5 was set with the Al$_2$(SO$_4$) solution. The added amount of Al$_2$(SO$_4$)$_3$ corresponded to a proportion of 0.1% Al$_2$O$_3$ with respect to BaSO$_4$.

Dispersibility Tests

Dispersibility of the samples was tested prior to and after 1, 4 and 7 days air-conditioning cabinet storage (35° C.; 70% air humidity) in accordance with the dispersing test described hereinafter. In regard to initial dispersibility all samples post-treated according to the invention (examples 1-5) were markedly better than the comparative sample 1 which was not subjected to post-treatment. The initial dispersibility levels of all samples post-treated according to the invention (examples 1-5) are also markedly improved in comparison with the inorganically post-treated comparative samples 2, 3 and 4. Even after air-conditioning cabinet storage the samples produced according to the invention from examples 1 to 5 can be markedly better dispersed than comparative sample 1 which was not subjected to inorganic post-treatment and comparative samples 2, 3 and 4.

In accordance with the invention, it is to be understood that inorganic additives and particles such as barium sulphate possess a good dispersibility if they have a fineness of less than 25 μm (corresponding to Hegman 6 or 1 mils resp.) after a 6 months storage time under real practice conditions. As a test under forced conditions, the fineness can be evaluated after an air-conditioning cabinet storage (35° C., 70% air humidity) for seven days and should be less than 25 μm for a good dispersibility.

| Storage time in air-conditioning cabinet [days] | CE 1 | | CE 2 | | CE 3 | | CE 4 | |
|---|---|---|---|---|---|---|---|---|
| | F [μm] | O [μm] | F [μm] | O [μm] | F [μm] | O [μm] | F [μm] | O [μm] |
| 0 | 13 | 20 | 17 | 25 | 15 | 23 | 14 | 22 |
| 1 | 15 | 30 | 25 | 35 | 20 | 25 | 16 | 24 |
| 4 | 20 | 35 | 30 | 60 | 20 | 40 | 22 | 36 |
| 7 | 30 | 50 | 30 | 60 | 30 | 40 | 34 | 40 |

| Storage time in air-conditioning cabinet [days] | E 1 | | E 2 | | E 3 | | E 4 | | E 5 | |
|---|---|---|---|---|---|---|---|---|---|---|
| | F [μm] | O [μm] | F [μm] | O [μm] | F [μm] | O [μm] | F [μm] | O [μm] | F [μm] | O [μm] |
| 0 | 7 | 14 | 7 | 12 | 8 | 13 | 8 | 13 | 10 | 15 |
| 1 | 10 | 17 | 10 | 13 | 10 | 15 | 11 | 14 | 15 | 22 |
| 4 | 13 | 25 | 12 | 20 | 12 | 18 | 12 | 18 | 18 | 20 |
| 7 | 17 | 35 | 14 | 25 | 12 | 20 | 13 | 20 | 22 | 25 |

CE: comparative example
E: example
F: fineness
O: oversize grain

As can be shown the inorganic post-treatment carried out in accordance with the invention has a positive influence on dispersibility and storage stability after air-conditioning cabinet storage of barium sulphate.

Dispersing Test 2.5 g of binding agent (Synolac AS 631 HV 48% in test benzine) is weighed out into the plastic beaker, thereafter 5 g of sample material is added. The whole is thoroughly well kneaded with a spatula and then put onto the lower plate of an automatic pigment mill, for example JEL/25/53. Dispersing was then effected with an application weight of 2.5 kg (corresponds to 50 kg/cm$^2$) at 1×25 revolutions. The dispersed paste is taken from the glass plate with the spatula, introduced into a second plastic beaker and diluted with 1.5 g (±0.2 g) of binding agent and drawn out on a grindometer. The degree of crushing fineness (grain size) is determined on the basis of DIN/EN/ISO 1524. The oversize grain is read off on the scale where the first agglomerate or agglomerates is or are to be seen on the inclination. The visually ascertained grain fineness value or oversize grain are noted.

The invention claimed is:

1. A process for the production of a storage-stable barium sulphate, comprising:
    a) adjusting a suspension of barium sulphate in a presence of an excess of sulphate ions to a pH-value of 9 to 12;
    b) mixing the suspension of barium sulphate with at least one aqueous solution of a water-soluble metal compound comprising a metal selected from the group consisting of sodium, potassium, calcium, barium, aluminum, silicon, and mixtures thereof, thereby dissolving the water-soluble metal compound in the suspension at the pH-value of 9 to 12 and forming a slurry,
    c) adjusting the slurry to a pH-value of 3 to 9 by addition of at least one acid or acid mixture comprising an aluminum sulphate solution, thereby precipitating a layer comprising a material made from said metal and said material is selected from the group consisting of a metal oxide, a metal hydroxide, a metal hydrate, a metal oxyhydroxide and a metal oxyhydrate on a surface of the barium sulphate particles; and
    d) filtering the barium sulphate particles, wherein the barium sulphate particles have a particle size in a range of 0.1-20 μm.

2. A process according to claim 1, wherein said layer comprises a silicate, aluminate, silicon dioxide, aluminum silicate, aluminum oxide, or hydrates thereof.

3. A process according to claim 2 wherein a layer of aluminium silicate is precipitated, wherein the weight ratio of Si/Al calculated as $SiO_2/Al_2O_3$ is in the range of 0.1/1-10/1.

4. A process according to claim 1 wherein the suspension in step a) comprises 20-60 wt. % of the barium sulphate.

5. A process according to claim 1 wherein in step b) up to 20% by weight of the water-soluble metal compound is dissolved with respect to barium sulphate.

6. A process according to claim 1, further comprising a maturing treatment over a period of 60 to 240 minutes after said precipitating.

7. A process according to claim 1, wherein said precipitating is carried out at a temperature of at least 20° C.

8. A process according to claim 1, wherein a layer comprising an aluminium-silicon oxygen compound, hydrates thereof, and mixtures thereof is precipitated, wherein the weight ratio of Si/Al calculated as $SiO_2/Al_2O_3$ is in the range of 0.1/1-10/1.

9. A process according to claim 1, further comprising mixing the barium sulphate particles from step d) with one or more additives selected from the group consisting of surfactants, wetting agents, dispersing agents, soaps and deflocculation agents.

10. A process according to claim 1, further comprising drying and crushing the barium sulphate particles from step d).

11. A process according to claim 1, wherein the barium sulphate particles are of a particle size in the range of 1.5-20 µm.

12. A process according to claim 1, wherein a single layer of aluminum oxide is precipitated on the surface of the barium sulphate particles.

13. A process according to claim 1, wherein a single layer of aluminum silicate is precipitated on the surface of the barium sulphate particles.

14. A process for the production of barium sulphate, comprising:
   forming an aqueous slurry comprising barium sulphate particles and an excess of sulphate ions at a pH-value of 9 to 12 to form a suspension;
   adding at least one aqueous solution of sodium silicate or potassium silicate to the suspension and dissolving the sodium silicate or potassium silicate;
   adding an aqueous aluminum sulphate solution to adjust the pH of the suspension to a pH-value of 3 to 9; and
   precipitating a layer comprising an aluminum-silicon oxygen compound on the surface of the barium sulphate particles.

15. A process according to claim 14, wherein a weight ratio of Si/Al of the aluminum-silicon oxygen compound, calculated as $SiO_2/Al_2O_3$, is in the range of 0.1/1 to 10/1.

* * * * *